(12) United States Patent
Wade

(10) Patent No.: US 12,002,123 B2
(45) Date of Patent: Jun. 4, 2024

(54) SYSTEM AND METHOD FOR AUTOMATIC GENERATION OF FREEDOM OF INFORMATION ACT (FOIA)

(71) Applicant: Biometrica Systems, Inc., Las Vegas, NV (US)

(72) Inventor: Wyly Wade, Las Vegas, NV (US)

(73) Assignee: Biometrica Systems, Inc., Las Vegas, NV (US)

( * ) Notice: Subject to any disclaimer, the term of this patent is extended or adjusted under 35 U.S.C. 154(b) by 447 days.

(21) Appl. No.: 16/569,295

(22) Filed: Sep. 12, 2019

(65) Prior Publication Data

US 2021/0082065 A1    Mar. 18, 2021

(51) Int. Cl.
| | | |
|---|---|---|
| G06F 17/00 | (2019.01) | |
| G06F 16/338 | (2019.01) | |
| G06F 16/583 | (2019.01) | |
| G06F 40/103 | (2020.01) | |
| G06F 40/174 | (2020.01) | |
| G06Q 50/18 | (2012.01) | |

(52) U.S. Cl.
CPC .......... *G06Q 50/18* (2013.01); *G06F 16/338* (2019.01); *G06F 16/583* (2019.01); *G06F 40/103* (2020.01); *G06F 40/174* (2020.01)

(58) Field of Classification Search
None
See application file for complete search history.

(56) References Cited

U.S. PATENT DOCUMENTS

| | | | |
|---|---|---|---|
| 10,878,524 B2 | 12/2020 | Zaich et al. | |
| 2019/0138586 A1* | 5/2019 | Dhawan | G06F 40/197 |
| 2019/0228356 A1* | 7/2019 | Aithal | G06Q 10/06375 |
| 2020/0106884 A1* | 4/2020 | Miyamoto | G06V 40/10 |

OTHER PUBLICATIONS

Mike Wasson et al., "N-tier architecture style", date: Aug. 29, 2018, total pp. 3, URL:<https://web.archive.org/web/20190310235411mp_/https://docs.microsoft.com/en-us/azure/architecture/guide/architecture-styles/n-tier> (Year: 2018).*

* cited by examiner

*Primary Examiner* — Mustafa A Amin
(74) *Attorney, Agent, or Firm* — Carlos R. Villamar; The Villamar Firm PLLC

(57) ABSTRACT

A system, method and computer program product for automatic generation of Freedom of Information Act (FOIA) requests, including a law enforcement server and database to store, retrieve and transmit information relating to an arrested individual; a FOIA request server and database to retrieve the information relating to the arrested individual from the law enforcement server, and automatically generate a FOIA request; and a FOIA request processing server and database to process the FOIA request. The FOIA request server includes a computer program to analyze the information relating to the arrested individual, and automatically generate the FOIA request based on missing information in the information relating to the arrested individual, and to automatically transmit the automatically generated FOIA request to the FOIA request processing server to process the FOIA request.

8 Claims, 2 Drawing Sheets

SYSTEM AND METHOD FOR AUTOMATIC GENERATION OF FREEDOM OF INFORMATION ACT (FOIA)

BACKGROUND OF THE INVENTION

Field of the Invention

The present invention generally relates to systems and methods for handling Freedom of Information Act (FOIA) requests, and more particularly to systems and methods for automatic generation of FOIA requests, and the like.

Discussion of the Background

In recent years, systems and methods for handling Freedom of Information Act (FOIA) requests have been developed. However, such systems typically are lacking in effective means, for example, for automatic generation of FOIA requests, and the like, in an efficient and cost-effective manner.

SUMMARY OF THE INVENTION

Therefore, there is a need for a method and system that addresses the above and other problems. The above and other problems are addressed by the illustrative embodiments of the present invention, which provide systems and for automatic generation of FOIA requests, and the like, in an efficient and cost-effective manner.

Accordingly, in illustrative aspects of the present invention there is provided a system, method and computer program product for automatic generation of Freedom of Information Act (FOIA) requests, including a law enforcement server and database to store, retrieve and transmit information relating to an arrested individual; a FOIA request server and database to retrieve the information relating to the arrested individual from the law enforcement server, and automatically generate a FOIA request; and a FOIA request processing server and database to process the FOIA request. The FOIA request server includes a computer program to analyze the information relating to the arrested individual, and automatically generate the FOIA request based on missing information in the information relating to the arrested individual, and to automatically transmit the automatically generated FOIA request to the FOIA request processing server to process the FOIA request.

The missing information in the information relating to the arrested individual received from the law enforcement server includes arrest data, including at least one of arrest number, height, weight, gender, eye color, hair color, date of birth, picture of a face associated with the arrested individual.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

The present invention includes recognition of the need for autogeneration of Freedom of Information Act (FOIA) requests to an applicable county or country equivalent jurisdictional authority, for example, when incoming digital information from a law enforcement body does not meet a predefined requisite threshold for completeness of the received information. For example, when internet bots are employed to ingest arrest data, the data received may not be a complete pre-defined data set from a particular arrest, such as including height, weight, gender, eye color, hair color, date of birth, picture of the face, etc. In this case, when the data ingestion reaches a predefined threshold (e.g., 40% of the data is received, and the data is missing a picture or other information, etc.), the illustrative system and method automatically triggers the automatic generation of a FOIA request. Such request, for example, can include the arrest number, and other pertinent case details, and can be generated, for example, by employing any suitable program, such as Google Print Cloud, a cloud-based print to PDF program, and the like.

Figure 1:
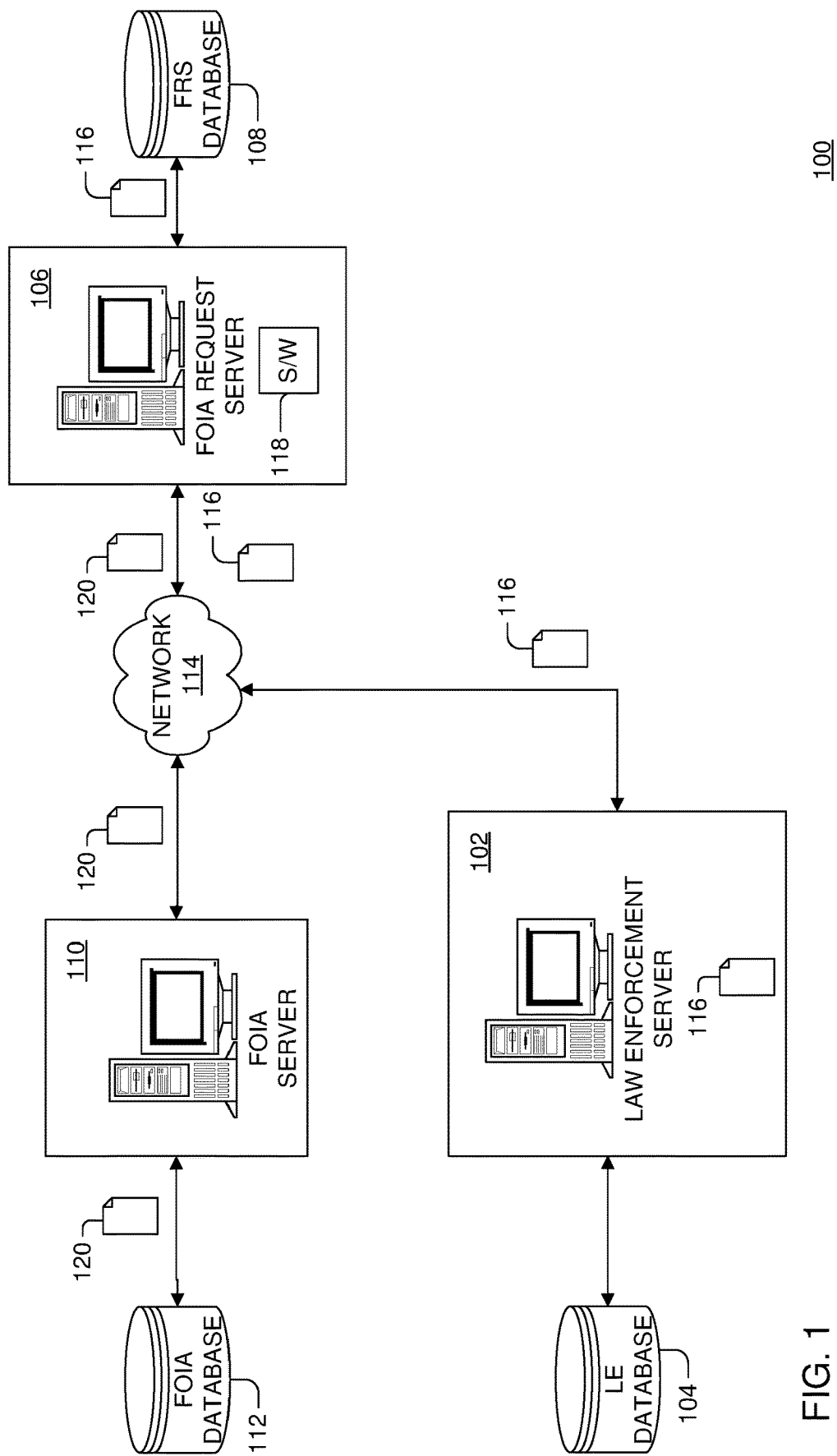
FIG. 1 is an illustrative system for automatic generation of Freedom of Information Act (FOIA) requests.

Referring now to the drawings, wherein like reference numerals designate identical or corresponding parts throughout the several views, and more particularly to FIG. 1 thereof, there shown an illustrative system, for example, for automatic generation of Freedom of Information Act (FOIA) requests, and the like, in an efficient and cost-effective manner. In FIG. 1, for example, a piece of digital information 116 is received from a database 104 of a law enforcement server 102 over network 114 (e.g., the internet) by a FOIA request server 106 having database 108. Then, for example, a software application or program 118 running on the FOIA request server 106 determines that digital information 116 does not meet a predefined threshold for completeness of data, as noted above. The program 118 process then triggers a FOIA notification 120 to be automatically generated and printed (e.g., using Google Print Cloud, a cloud-based print to PDF program, etc.).

The program 118 pre-populates the notification 120 with available data from the digital information 116 and/or the database 108, including as request for the missing relevant data to be provided. The notification 120 is then automatically sent by the FOIA request server 106, as a FOIA request 120 to a FOIA server 110 with corresponding database 112 over the network 114 for processing. For example, the FOIA server 110 can be for the District Attorney, equivalent jurisdictional authority in a county, county equivalent, other government jurisdictional body, and the like. The FOIA request 120 can be sent automatically over the network 114 and/or by physical mail, and the like.

For example, in Clark County, Nev., text information 116 is all that can be received. Accordingly, the FOIA server 106 can only determine an arrested individual's name and some demographic data, such as height, weight, gender, arrest number, and the main charge, with photographs not received. Accordingly, with the illustrative system, advantageously, every time incomplete arrest data is received, the system can auto-generate an outbound FOIA notification request 120, requesting the photo and any other available demographic data from the Clark County District Attorney's office, and the like.

Figure 2:
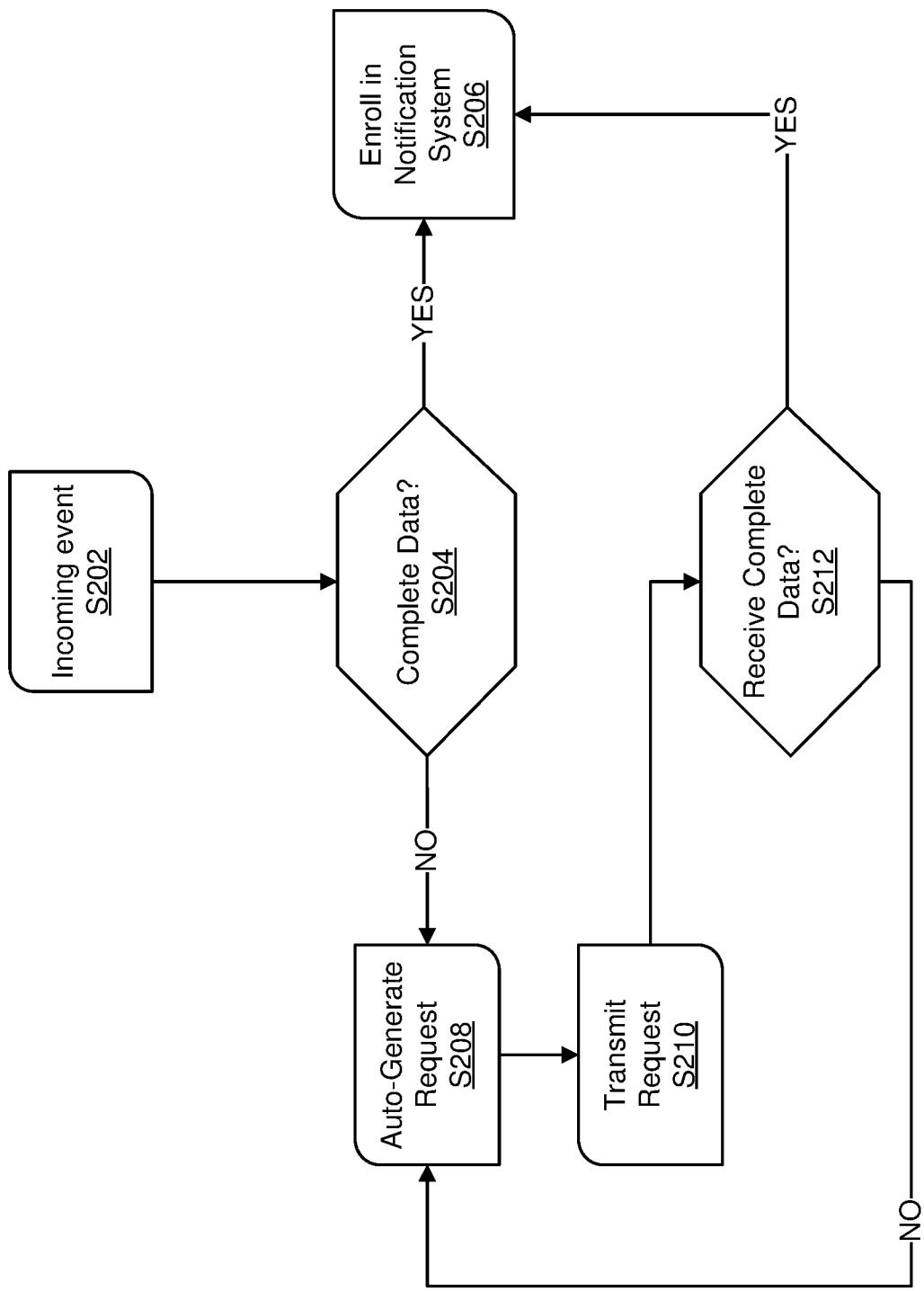
FIG. 2 is an illustrative flow chart for automatic generation FOIA requests.

FIG. 2 is an illustrative flow chart for automatic generation FOIA requests, and the like, in the system of FIG. 1. In FIG. 2, at step 202, an incoming event (e.g., wanted, warrant, be on the look out for (BOLO), suspect, warning, lost, banned/barred, fired, etc.) is received, for example, the text information 116, as described above. At step 204, the program 118 determines whether the data 116 received is complete (e.g., charges, photo, demographics, biometrics, case files, tax records, public data, etc.). If the data is complete, the data is stored as complete data in the database 108 at step 206. If the data 116 is determined to be incomplete, the system can autogenerate an outbound FOIA notification request 120 at step 208 (e.g., a FOIA letter, Demand letter, Clearance letter, a letter requesting further data, etc.), which is transmitted at step 210 to the proper authorities, as described above. After the FOIA request 120 is processed the proper authorities, the data received based on the request 120 from the proper authorities, is checked for completeness at step 212. If the data is now determined to be complete, the data is stored as complete data in the database 108 at step 206. If, however, the newly received data is determined to be incomplete, the system can autogenerate another suitable outbound FOIA notification request 120 at step 208.

Advantageously, the illustrative systems and methods allow, for example, for automatic generation of Freedom of Information Act (FOIA) requests, and the like, in an efficient and cost-effective manner.

Although the illustrative systems and methods are described in terms of automatically generating, for example, of FOIA requests, the illustrative systems and methods can be applied to any other suitable types of systems for automatically generated information, and the like, as will be appreciated by those of ordinary skill in the relevant art(s).

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All ora portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A method for automatic generation of Freedom of Information Act (FOIA) requests, the method comprising:
storing, retrieving, and transmitting, with a law enforcement server and database, digital information relating to an arrested individual;
receiving, with a FOIA request server and database distinct from the law enforcement server and coupled to the law enforcement server over a communications network, the digital information relating to the arrested individual from the law enforcement server, and automatically generating a FOIA request; and
processing, with a FOIA request processing server and database distinct from the law enforcement server and the FOIA request server and coupled to the FOIA request server over the communications network, the FOIA request,
wherein the receiving and automatically generating with the FOIA request server include:
upon receipt of the digital information relating to the arrested individual from the law enforcement server, automatically analyzing, via hardware circuitry, the digital information relating to the arrested individual received from the law enforcement server,
in response to the digital information relating to the arrested individual includes at least 40% of a height associated with the arrested individual, a weight associated with the arrested individual, a race associated with the arrested individual, a gender associated with the arrested individual, a charge associated with the arrested individual, a case file associated with the arrested individual, a tax record associated with the arrested individual, an eye color associated with the arrested individual, a hair color associated with the arrested individual, a date of birth associated with the arrested individual, and a picture of a face associated with the arrested individual as a result of the automatic analyzing:
storing the digital information relating to the arrested individual as complete data in the FOIA request database, and
in response to the digital information relating to the arrested individual includes less than 40% of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, an eye color associated with the arrested individual, the hair color associated with the arrested individual, a date of birth associated with the arrested individual, and the picture of the face associated with the arrested individual as the result of the automatic analyzing:
triggering, via the hardware circuitry, automatic pre-population of the FOIA request based on missing information in the information relating to the arrested individual received from the law enforcement server,
the FOIA request including at least an arrest number associated with the arrested individual;
the FOIA request including those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are included in the digital information relating to the arrested individual; and
the FOIA request requesting those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are not included in the digital information relating to the arrested individual, and automatically transmitting, via the hardware circuitry, the automatically pre-populated FOIA request to the FOIA request processing server, which is an entity that is different from an entity that the digital information relating to the arrested individual was received from, to process the FOIA request.

2. A system for automatic generation of Freedom of Information Act (FOIA) requests, the system comprising:

a law enforcement server and database implemented by at least hardware circuitry and configured to store, retrieve, and transmit digital information relating to an arrested individual;

a FOIA request server and database implemented by at least hardware circuitry distinct from the law enforcement server, coupled to the law enforcement server over a communications network, and configured to receive the digital information relating to the arrested individual from the law enforcement server, and automatically generate a FOIA request; and a FOIA request processing server and database implemented by at least hardware circuitry distinct from the law enforcement server and the FOIA request server, coupled to the FOIA request server over the communications network, and configured to process the FOIA request;

wherein the hardware circuitry of the FOIA request server is configured to:
upon receipt of the digital information relating to the arrested individual from the law enforcement server, automatically analyze the digital information relating to the arrested individual received from the law enforcement server, when the digital information relating to the arrested individual includes at least 40% of a height associated with the arrested individual, a weight associated with the arrested individual, a race associated with the arrested individual, a gender associated with the arrested individual, a charge associated with the arrested individual, a case file associated with the arrested individual, a tax record associated with the arrested individual, an eye color associated with the arrested individual, a hair color associated with the arrested individual, a date of birth associated with the arrested individual, and a picture of a face associated with the arrested individual as a result of the automatic analyzing:
store the digital information relating to the arrested individual as complete data in the FOIA request database, and when the digital information relating to the arrested individual includes less than 40% of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual as the result of the automatic analyzing:
trigger automatic pre-population of the FOIA request based on missing information in the digital information relating to the arrested individual received from the law enforcement server,
the FOIA request including at least an arrest number associated with the arrested individual;
the FOIA request including those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are included in the digital information relating to the arrested individual; and
the FOIA request requesting those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are not included in the digital information relating to the arrested individual, and
automatically transmit the automatically pre-populated FOIA request to the FOIA request processing server, which is an entity that is different from an entity that the digital information relating to the arrested individual was received from, to process the FOIA request.

3. The system of claim 2, wherein the hardware circuitry of the FOIA request server is configured to automatically generate the FOIA request by auto-populating the FOIA request with the information relating to the arrested individual received from the law enforcement server.

4. The system of claim 2, wherein the hardware circuitry of the FOIA request server is configured to:
receive data from the FOIA request processing server in response to the FOIA request,
upon receipt of the data, automatically analyze the data received from the FOIA request processing server in response to the FOIA request,
automatically generate another FOIA request based on missing information in the data received from the FOIA request processing server in response to the FOIA request, and
automatically transmit the other automatically generated FOIA request to the FOIA request processing server to process the other FOIA request.

5. The system of claim 2, wherein the hardware circuitry of the FOIA request server is configured to:
when the digital information relating to the arrested individual does not include the race associated with the arrested individual and the gender associated with the arrested individual as the result of the automatic analyzing:
   trigger the automatic pre-population of the FOIA request based on the missing information in the digital information relating to the arrested individual received from the law enforcement server,
      the FOIA request including at least an arrest number associated with the arrested individual:
      the FOIA request including those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are included in the digital information relating to the arrested individual; and
      the FOIA request requesting the race associated with the arrested individual and the gender associated with the arrested individual, and
   automatically transmit the automatically pre-populated FOIA request to the FOIA request processing server, which is the entity that is different from the entity that the digital information relating to the arrested individual was received from, to process the FOIA request.

6. The system of claim 2, wherein the hardware circuitry of the FOIA request server is configured to:
   when the digital information relating to the arrested individual does not include the charge associated with the arrested individual and the picture of the face associated with the arrested individual as the result of the automatic analyzing:
   trigger the automatic pre-population of the FOIA request based on the missing information in the digital information relating to the arrested individual received from the law enforcement server,
      the FOIA request including at least an arrest number associated with the arrested individual;
      the FOIA request including those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are included in the digital information relating to the arrested individual; and
      the FOIA request requesting the charge associated with the arrested individual and the picture of the face associated with the arrested individual, and
   automatically transmit the automatically pre-populated FOIA request to the FOIA request processing server, which is the entity that is different from the entity that the digital information relating to the arrested individual was received from, to process the FOIA request.

7. A system for automatic generation of Freedom of Information Act (FOIA) requests, the system comprising:
   a FOIA request server and database implemented by at least hardware circuitry, the FOIA request server being coupled to a law enforcement server that is distinct from the FOIA request server and is configured to store, retrieve, and transmit digital information relating to an arrested individual, the FOIA request server being coupled a FOIA request processing server that is distinct from the law enforcement server and the FOIA request server and is configured to process a FOIA request, and the hardware circuitry being configured to:
   receive the digital information relating to the arrested individual from the law enforcement server;
   upon receipt of the digital information relating to the arrested individual from the law enforcement server, automatically analyze the digital information relating to the arrested individual received from the law enforcement server;
   when the digital information relating to the arrested individual includes at least 40% of a height associated with the arrested individual, a weight associated with the arrested individual, a race associated with the arrested individual, a gender associated with the arrested individual, a charge associated with the arrested individual, a case file associated with the arrested individual, a tax record associated with the arrested individual, an eye color associated with the arrested individual, a hair color associated with the arrested individual, a date of birth associated with the arrested individual, and a picture of a face associated with the arrested individual as a result of the automatic analyzing:
      store the digital information relating to the arrested individual as complete data in the FOIA request database; and
   when the digital information relating to the arrested individual includes less than 40% of the height associated with the arrested individual, a weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual as the result of the automatic analyzing:
      trigger automatic pre-population of the FOIA request based on missing information in the digital information relating to the arrested individual received from the law enforcement server,
         the FOIA request including at least an arrest number associated with the arrested individual;
         the FOIA request including those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are included in the digital information relating to the arrested individual; and the FOIA request requesting those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are not included in the digital information relating to the arrested individual; and automatically transmit the automatically pre-populated FOIA request to the FOIA request processing server, which is an entity that is different from an entity that the digital information relating to the arrested individual was received from, to process the FOIA request.

8. A non-transitory computer-readable medium for automatic generation of Freedom of Information Act (FOIA) requests and with instructions stored thereon, that when executed by a processor, perform steps comprising:

storing, retrieving, and transmitting with a law enforcement server and database digital information relating to an arrested individual;

receiving, with a FOIA request server and database distinct from the law enforcement server and coupled to the law enforcement server over a communications network, the digital information relating to the arrested individual from the law enforcement server, and automatically generating a FOIA request; and processing, with a FOIA request processing server and database distinct from the law enforcement server and the FOIA request server and coupled to the FOIA request server over the communications network, the FOIA request, wherein the receiving and automatically generating with the FOIA request server include:

upon receipt of the digital information relating to the arrested individual from the law enforcement server, automatically analyzing, via hardware circuitry, the digital information relating to the arrested individual received from the law enforcement server, when the digital information relating to the arrested individual includes at least 40% of a height associated with the arrested individual, a weight associated with the arrested individual, a race associated with the arrested individual, a gender associated with the arrested individual, a charge associated with the arrested individual, a case file associated with the arrested individual, a tax record associated with the arrested individual, an eye color associated with the arrested individual, a hair color associated with the arrested individual, a date of birth associated with the arrested individual, and a picture of a face associated with the arrested individual as a result of the automatic analyzing:

storing the digital information relating to the arrested individual as complete data in the FOIA request database, and when the digital information relating to the arrested individual includes less than 40% of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual as the result of the automatic analyzing:

triggering, via the hardware circuitry, automatic pre-population of the FOIA request based on missing information in the information relating to the arrested individual received from the law enforcement server, the FOIA request including at least an arrest number associated with the arrested individual;

the FOIA request including those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are included in the digital information relating to the arrested individual; and the FOIA request requesting those of the height associated with the arrested individual, the weight associated with the arrested individual, the race associated with the arrested individual, the gender associated with the arrested individual, the charge associated with the arrested individual, the case file associated with the arrested individual, the tax record associated with the arrested individual, the eye color associated with the arrested individual, the hair color associated with the arrested individual, the date of birth associated with the arrested individual, and the picture of the face associated with the arrested individual that are not included in the digital information relating to the arrested individual, and automatically transmitting, via the hardware circuitry, the automatically pre-populated FOIA request to the FOIA request processing server, which is an entity that is different from an entity that the digital information relating to the arrested individual was received from, to process the FOIA request.

* * * * *